Sept. 20, 1960  J. E. WHELAN  2,953,391
AIR SUSPENSION CONTROL VALVE
Filed Nov. 6, 1958  2 Sheets-Sheet 1

INVENTOR.
James E. Whelan
BY
D. C. Staley
His Attorney

Sept. 20, 1960    J. E. WHELAN    2,953,391
AIR SUSPENSION CONTROL VALVE
Filed Nov. 6, 1958    2 Sheets-Sheet 2
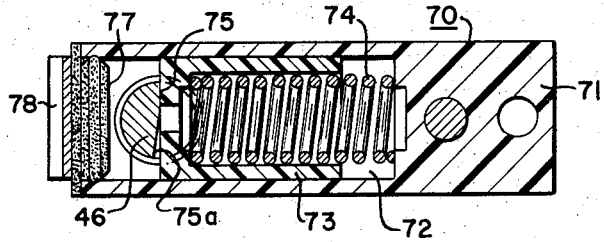
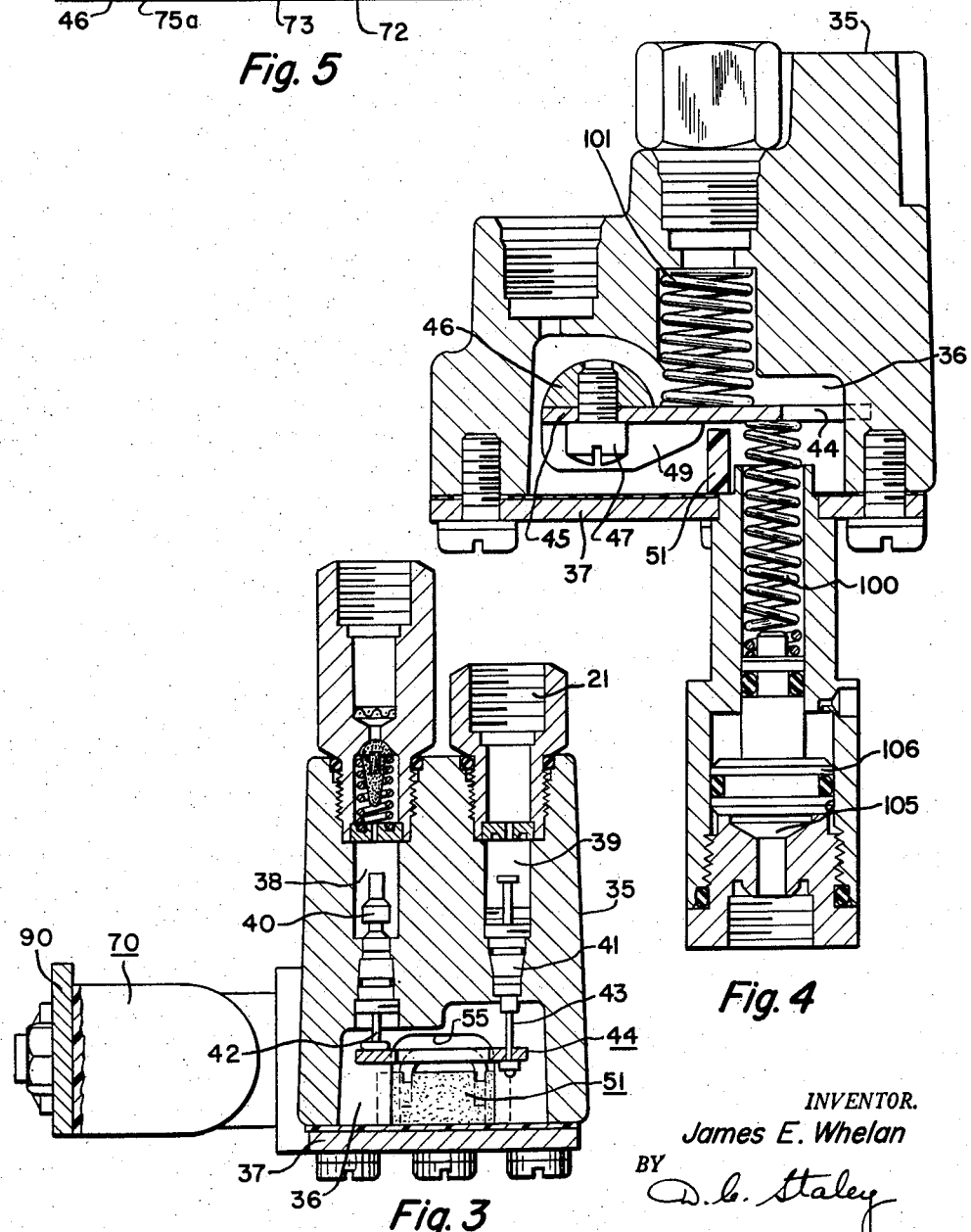
INVENTOR.
James E. Whelan
BY
His Attorney

United States Patent Office 2,953,391
Patented Sept. 20, 1960

2,953,391

AIR SUSPENSION CONTROL VALVE

James E. Whelan, Dayton, Ohio, assignor to General Motors Corporation, Detroit, Mich., a corporation of Delaware Filed Nov. 6, 1958, Ser. No. 772,345

11 Claims. (Cl. 280—124)

This invention relates to control valve means adapted for controlling the flow of air under pressure to and from an air spring positioned between the sprung mass and the unsprung mass of a vehicle, the control valve being adapted for actuation in response to a change in clearance height between the sprung mass and the unsprung mass of a vehicle whereby to maintain the clearance height between the sprung mass and the unsprung mass at a relatively constant value.

Motor vehicles of various types, particularly passenger cars, trucks and buses, are being supplied with air springs positioned between the sprung mass and the unsprung mass of the vehicle, the air springs replacing coil springs and leaf springs heretofore used in such vehicles.

The air springs comprise a chamber containing air under pressure with at least one wall of the chamber being expansible and movable relative to the remaining part of the chamber whereby the sprung mass may move relative to the unsprung mass. The air chamber receives sufficient air pressure normally to maintain a predetermined clearance height between the sprung mass and the unsprung mass of the vehicle and thereby support the sprung mass upon the unsprung mass in a static condition, whereby the body of the vehicle will be maintained at a predetermined clearance height above the axle of the vehicle.

Control valve means are provided for regulating the supply of air to the air spring and exhaust of air from the air spring to change the pressure value of air within the spring in response to the load requirement of the sprung mass. That is, as the load within the body of the vehicle increases, the pressure of the air within the air spring will be increased to a value whereby the predetermined clearance height is maintained relatively constant. Similarly, upon a decrease of load in the sprung mass of the vehicle, the air pressure in the air spring will be reduced so that the clearance height will again remain at the predetermined value. This control of the flow of air pressure into the air spring and exhaust of air from the air spring is regulated by control valves that are actuated in response to a change in clearance height between the sprung mass and the unsprung mass so that the valves will open to allow air to flow into the air spring when the clearance height is below a predetermined value and will allow air to exhaust from the air spring when the clearance height is above a predetermined value.

While air suspension systems of the type just described have been used to a relatively large extent, yet there are conditions of operation of a vehicle under which it is desirable to raise the sprung mass of the vehicle, at least temporarily, to a clearance height that is substantially greater than that normally maintained by the control valve. Such conditions exist, for example, when a vehicle having a low clearance height is attempted to be placed upon grease racks of an old style, and when the vehicle is operated over bad road conditions that are deeply rutted or if the center of the road is highly crowned, as can be found in certain areas. Such operating conditions require that the body of the vehicle be elevated to an extent greater than the normal clearance height to prevent the vehicle from getting hung up on the grease rack or dragging some low portion of the vehicle on the ground.

It is, therefore, an object of this invention to provide an improved form of air pressure control valve for regulating flow of air to the air spring and exhaust of air therefrom that is constructed and arranged to provide for one operating condition establishing one predetermined clearance height between the sprung mass and the unsprung mass of the vehicle and also provide for a second and increased clearance height between the sprung mass and the unsprung mass of the vehicle, the shift from the one clearance height to the other clearance height being under control of the operator of the vehicle.

It is another object of the invention to provide an improved form of air pressure control valve for regulating the supply and exhaust of air to and from an air spring wherein the control valve is provided with a valve operating arm to actuate the supply and exhaust valves of the control valves, the valve operating arm being provided with a plurality or multiplicity of cam faces that are adapted to be engaged by an actuating means connected with the unsprung mass of the vehicle and responding to changes in clearance height between the sprung mass and the unsprung mass of the vehicle, the actuating member or actuating means being adapted to be shifted between the cam faces whereby to change the angular relationship between the valve operating member and the actuating means which thereby changes the operating clearance height between the sprung mass and the unsprung mass of the vehicle from one value to a second value.

It is another object of the invention to provide an air pressure control valve for regulating the supply and exhaust of air to and from an air spring having inlet and exhaust valves operated by a valve operating member or valve operating arm that has associated therewith angularly related cam faces that are engaged by a resilient member of an overtravel mechanism that connects the control valve with the unsprung mass of the vehicle to effect response of the control valve in accordance with changes in clearance height between the sprung mass and the unsprung mass, the overtravel mechanism being movable from one cam face to another of the angularly related cam faces so as to change the angular relationship between the valve operating member or means and the overtravel mechanism from one angular position which establishes and maintains one predetermined clearance height between the sprung mass and the unsprung mass of the vehicle to a second and different angular relationship between the valve operating means and the overtravel mechanism to establish a second and different clearance height between the sprung mass and the unsprung mass of the vehicle that is then maintained by the control valve, the changing of the angular relationship between the valve operating means and the overtravel mechanism being under control of the operator of the vehicle for selection as the operator desires.

It is another object of the invention to provide an air pressure control valve in accordance with the foregoing object wherein the valve operating means or valve operating member is spring biased into one of the selective positions for maintaining one predetermined clearance height between the sprung mass and the unsprung mass and wherein the biasing of the spring means is changed under control of the operator of the vehicle to shift the angular relationship between the valve operating means and the overtravel mechanism from one position to another for thereby changing the operating predetermined clearance height of the vehicle from one value to another.

It is another object of the invention to provide an air pressure control valve for supplying and exhausting air to and from an air spring wherein the control valve is provided with inlet and exhaust valves operated by a valve operating arm carried on an oscillatable shaft that, in turn, is actuated by an actuating member connected with the unsprung mass of the vehicle to oscillate the shaft in response to movement between the sprung mass and the unsprung mass of the vehicle, the oscillating shaft having radially disposed angularly displaced faces engaged by the plunger member of an overtravel mechanism that allows for greater movement of the sprung mass relative to the unsprung mass than is provided for in operation of the inlet and exhaust valves, the plunger member of the overtravel mechanism being adapted to engage either of the angularly related faces on the oscillating shaft so as to change the angular relationship between the overtravel mechanism and the valve operating arm which, in turn, changes the range of operation of the control valve so as to establish one predetermined clearance height between the sprung mass and the unsprung mass of the vehicle when the plunger member of the overtravel mechanism engages one of the angularly related faces to establish a first angularly related position of the overtravel mechanism relative to the valve operating arm, movement of the plunger of the overtravel mechanism into engagement with the other of the angularly related faces of the oscillating shaft changing the angular relationship between the valve operating member and the overtravel mechanism to a second relationship which changes the predetermined clearance height between the sprung mass and the unsprung mass of the vehicle to a second and different value.

Further objects and advantages will be apparent from the drawings and following description.

In the drawings:

Fig. 3 is a cross-sectional view of the control valve taken along line 3—3 of Fig. 2.

Fig. 4 is a cross-sectional view taken along line 4—4 of Fig. 2.

Fig. 5 is a cross-sectional view taken along line 5—5 of Fig. 2.

Figure 1:
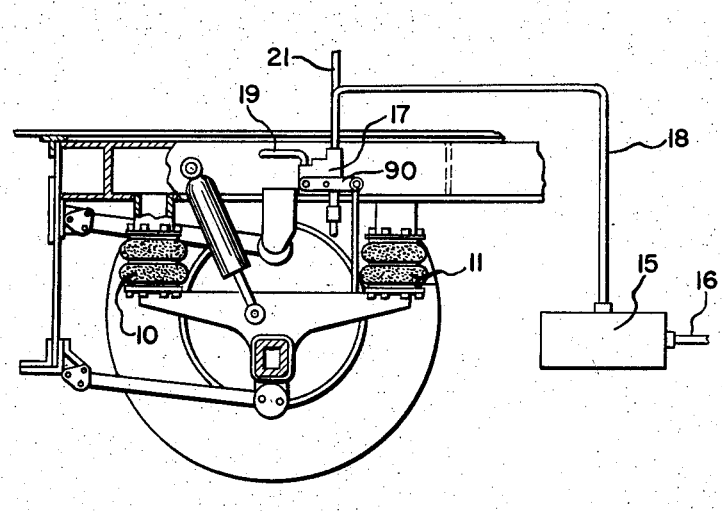
Fig. 1 is a schematic illustration of a vehicle having an air suspension system adapted to incorporate a control valve constructed and arranged in accordance with this invention.

In Fig. 1 there is illustrated a schematic air suspension system adapted for use on a motor vehicle wherein air springs or fluid springs are provided between the axle and body of the vehicle, that is between the sprung mass and the unsprung mass, and the air is supplied to the air springs under control of the air control valve of this invention as well as exhaust of air under control of the valve. In the schematic air suspension system for the motor vehicle, there is provided air springs 10 and 11 positioned between the axle and body of the vehicle to resiliently support the body upon the axle structure. Air under pressure is supplied to the air suspension system by means of a compressor, not shown, that is driven in any suitable manner, preferably being belted from the engine of the vehicle. The compressor delivers air under pressure into a high-pressure supply tank 15 through the line 16, and air under pressure is supplied to the control valve 17 by means of the line 18. Air under pressure is supplied to the air springs 10 and 11 by means of the line 19 and air is exhausted from the air springs 10 and 11 through the same line under control of the valve 17.

An air control valve adapted for controlling and regulating the supply of air under pressure and exhaust of air under pressure to and from the air spring in response to movement between the sprung mass and the unsprung mass of the vehicle to maintain a predetermined clearance height therebetween is described and disclosed in the copending application of John F. Pribonic and Wayne A. Karlgaard, Ser. No. 750,416 filed July 23, 1958, having the same assignee as this application, over which the two-position control valve of this invention to establish and maintain two different clearance heights between the sprung mass and the unsprung mass of the vehicle is an improvement, the control valve of the aforesaid application being adapted to establish and maintain one predetermined clearance height between the sprung mass and the unsprung mass of a vehicle.

The height control valve 17 consists of a valve body 35 that has an air receiving chamber 36 closed by a cover member 37. An air inlet passage 38 is provided for supply of air under pressure into the air receiving chamber 36, the air inlet passage being connected with the line 18 for supply of the fluid under pressure from the high-pressure reservoir 15. The control valve is also provided with an exhaust passage 39 that connects with an exhaust line connection 21 for exhaust of air from the air spring under control of the control valve.

Figure 2:
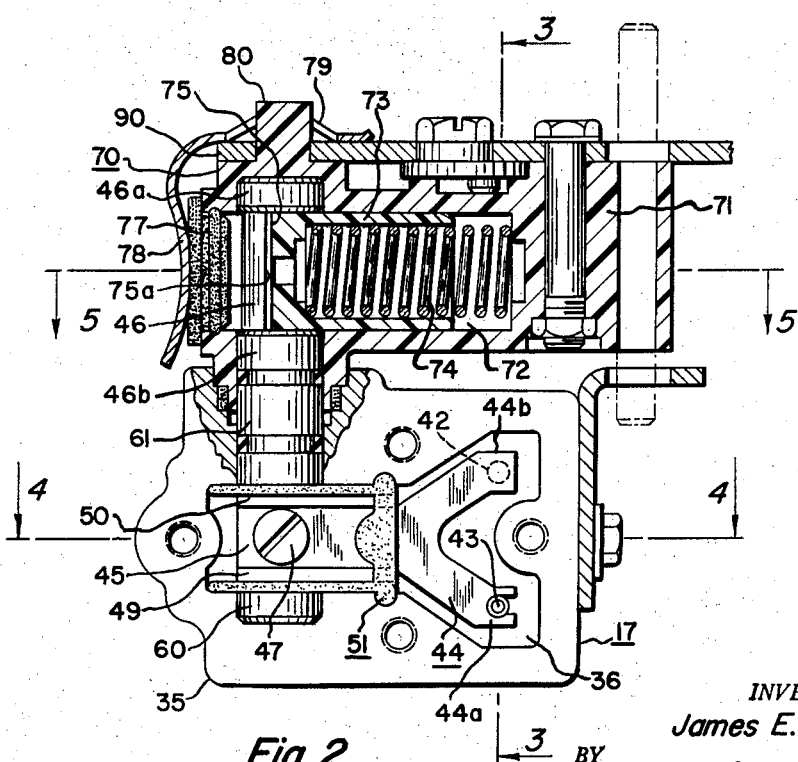
Fig. 2 is a transverse cross-sectional view of the control valve incorporating features of this invention.

The air inlet passage 38 has a flow control valve 40 that is of the normal tire valve variety with the valve 40 being positioned such that flow of air from the passage 38 into the air receiving chamber 36 is normally cut off by the valve 40. A similar flow control valve 41 is placed in the exhaust passage 39 and is also of the common tire valve type and is disposed in the passage 39 in a manner that flow of air from the air receiving chamber 36 into the exhaust passage 39 is cut off. The control valve 40 has an actuating stem 42 projecting into the air receiving chamber 36 and, similarly, the valve 41 has an actuating stem 43 extending into the chamber 36. The actuating stems 42 and 43 are connected to a valve actuating member or valve actuating means 44 that is Y-shaped as illustrated in Fig. 2, with the arm 44a being connected with the stem 43 of the exhaust valve 41 and the arm 44b being in engagement with the stem 42 of the inlet valve 40.

The stem portion or leg portion 45 of the Y-shaped valve actuating member 44 is secured to an oscillatable shaft 46 on a flat portion of the shaft by means of the screw 47. The attachment of stem portion 45 of the actuating member 44 is more specifically illustrated in Fig. 4.

The actuating arm 44 has the shoulders 49 and 50 along opposite edges of the stem or leg portion 45 of the member 44, these shoulders 49 and 50 being positioned in parallel relation and being adapted to prevent axial movement of the shaft 46 within the valve body in cooperation with the thrust and stop limit member 51.

As more particularly shown in Fig. 3, the member 51 provides the stop limit for downward movement of the actuating arm 44, and the wall 55 of the valve body provides the limit stop for upward movement of the actuating member 44. Thus, the total movement of the actuating member 44 is controlled within narrow limits to regulate the maximum degree of movement of the valve members 40 and 41 to avoid overtravel of the valve members which could result in damage to these members if such overtravel were allowed.

The oscillatable shaft 46 has the end 60 journaled in the valve body 35 and has the mid portion 61 journaled in the valve body on the opposite side of the chamber 36. The shaft 46 extends externally of the valve body 35 and has an overtravel mechanism 70 supported on the end of the shaft 46.

The overtravel mechanism 70 consists of a body 71 that has a cylindrical chamber 72 receiving a piston plunger member 73 that is urged by a compression spring 74 against either of the flat faces 75 and 75a on the shaft 46 whereby the shaft 46 is retained in predetermined angular relationship relative to the body 71 of the overtravel mechanism and also in predetermined angular relationship relative to the valve operating member 44.

The association of the piston plunger member 73 with the flat surfaces of faces 75 and 75a will be hereinafter more fully described.

The body of the overtravel mechanism is supported on the shaft 46 by the shaft having the end portion 46a journaled in the body 71 and a portion 46b also journaled in the body 71. Thus, the body 71 of the overtravel mechanism is free for rotation upon the shaft 46, that is upon the end portion thereof that projects outside the valve body 35, except as restrained by the spring-urged piston plunger member 73. The cylindrical opening 72 in the body 71 is closed by a cap member 77 that is held on the end of the body by means of a spring 78 that has a friction portion 79 securing the spring 78 on the projection 80 that extends from the body 71 of the overtravel mechanism.

From the foregoing description it will be quite apparent that when the overtravel mechanism 70 is actuated by the operating arm 90 carried on the member 70 to effect oscillation of the shaft 46, the shaft 46 will be oscillated by up-and-down travel of the overtravel mechanism 70 because of the urgence of the piston 73 against one of the flat portions 75 or 75a on the shaft 46, the piston member 73 tending to hold the body of the overtravel mechanism in a predetermined angular relationship on the shaft 46 relative to the valve operating member 44 so that oscillation of the shaft 46 within the limits allowed to the shaft by the valve actuating device will oscillate the valve operating member 44 between the limit stops 55 and 51.

When the overtravel mechanism is urged to move upwardly or downwardly to an extent greater than the movement allowed by the valve operating arm 44 the piston 73 of the overtravel mechanism will be moved backwardly against the compression spring 74 by the edges of the respective flat portions 75 or 75a engaged by the piston so as to allow the overtravel mechanism to move to any extent necessary that the operating arm 90 can move with the axle or with the body of the vehicle depending upon which part the member 90 is connected to.

From the foregoing description it will be apparent that with the piston plunger member 73 engaging the flat face 75 on the shaft 46, there is established an angular relationship between the axis of the overtravel mechanism and the plane of the valve operating arm 44. This angular relationship is such that in operation of the control valve, air under pressure will be supplied to the air spring and exhausted from the air spring by oscillation of the shaft 46 to open and close the inlet and exhaust valves 40 and 41 in a manner to maintain a predetermined height relation between the body and the running gear of the vehicle, that is between the sprung mass and the unsprung mass. There is a preferred clearance height relation desired to be established between the body and the running gear of the vehicle. Thus, under normal operating conditions of the vehicle, the piston plunger member 73 will engage the flat face 75 on the shaft 46.

The shaft 46 is retained in a selected position to insure engagement of the surface 75 with the piston plunger 73 by means of the biasing springs 100 and 101 placed on opposite sides of the valve operating arm 44, as shown in Fig. 4. The biasing springs 100 and 101 are arranged normally that spring 101 will overcome the effect of spring 100 thereby biasing the valve operating arm 44 in a downward direction so that with, in effect, the overtravel mechanism and the plunger member 73 being held stationary, because of its connection with the axle of the vehicle, the biasing of the arm 44 in a downward direction, as viewed in Fig. 4, will tend to rotate the shaft 46 in a clockwise direction whereby the surface or face 75 of the shaft 46 will be retained in engagement with the end of the piston plunger 73. The angular relationship established between the overtravel mechanism 70 and the valve operating member 44 establishes an operating condition of the control valve which establishes and maintains a first predetermined clearance height between the sprung mass and the unsprung mass of the vehicle.

When the clearance height relation between the sprung mass and the unsprung mass is to be changed, such as to elevate the sprung mass relative to the unsprung mass to a greater extent than that normally maintained, the biasing arrangement of the springs 101 and 100 is reversed so that spring 100 overcomes the effect of spring 101 and tends to bias the valve operating arm 44 in an upward direction. When this occurs, it is apparent that this biasing effect of spring 100 on the arm 44 will tend to rotate the shaft 46 in a counterclockwise direction to bring the surface 75a into engagement with the piston plunger member 73. The resultant effect is to change the angular relationship between the axis of the overtravel mechanism 70 and the plane of the valve control member 74, which thereby changes the operating range of the control valve so that a second and different predetermined clearance height is established and maintained between the sprung mass and the unsprung mass of the vehicle, which in this instance is to elevate the clearance height of the sprung mass.

The change in clearance height from one position to another or from one value to another is under control of the operator of the vehicle by a suitably mounted control member or control valve that supplies air under pressure into the cylinder 105 having a piston 106 reciprocable therein on the forward end of which the spring 100 rests. When air is supplied into the cylinder chamber 105, the piston 106 moves to compress the spring 100 and thereby increase its force acting against the spring 101 to change the biasing effect as heretofore described.

Whenever the operator of the vehicle desires to lower the sprung mass relative to the unsprung mass and return it to its lower or normal predetermined clearance height, the air is released from the cylinder chamber 105 and the springs will return to the biasing condition wherein spring 101 overcomes the effect of spring 100 and returns the face 75 of the shaft 46 into engagement with the plunger member 73.

While the embodiments of the present invention as herein disclosed constitute a preferred form, it is to be understood that other forms might be adopted.

What is claimed is as follows:

1. A height control or leveling valve for use in a fluid suspension system for a vehicle to maintain multiple positions of predetermined clearance height of different value between the sprung mass and the unsprung mass of a vehicle, comprising, control valve means having inlet and exhaust valve means for control of fluid to and from a fluid suspension means, valve operating means connected with said inlet and exhaust valve means to operate the same, actuating means operated by a change in clearance height between the sprung mass and the unsprung mass of a vehicle connected with said valve operating means to operate the same, said valve operating means and said actuating means having a multiple faced cam operating connection therebetween providing for multiple angularly related positioning of said valve operating means relative to said actuating means to change thereby the effective operating positoin of the said valve operating means relative to said actuating means and thereby change the said clearance height from one value to another, said cam normally having one face thereof providing operating connection between said valve operating means and said actuating means to establish one angularly related position between said valve operating means and said actuating means, and manually operated means connected with said valve operating means to change the operating connection of the said valve operating means to said actuating means to another of said cam faces to change thereby the angular relation between said valve operating means and said actuating means and change thereby the clearance height between the sprung mass and the unsprung mass of the vehicle.

2. A height control or leveling valve for use in a fluid suspension system for a vehicle to maintain multiple positions of predetermined clearance height of different value between the sprung mass and the unsprung mass of a vehicle, comprising, control valve means having inlet and exhaust valve means for controlling flow of fluid to and from fluid suspension means, valve operating means connected with said inlet and exhaust valve means to operate the same, actuating means operated by a change in clearance height between the sprung mass and the unsprung mass of a vehicle connected with said valve operating means to operate the same, said valve operating means and said actuating means having a multiple faced cam operating connection therebetween providing for a first predetermined angularly related operating position of said valve operating means relative to said actuating means to maintain a first normal predetermined clearance height between the sprung mass and the unsprung mass of a vehicle and providing for a second angularly related position of said operating means relative to said actuating means changing the effective operating position of the said valve operating means relative to the said actuating means to establish a second above-normal predetermined clearance height between the sprung mass and the unsprung mass of the vehicle.

3. A height control or leveling valve for use in a fluid suspension system for a vehicle to maintain multiple positions of predetermined clearance height of different value between the sprung mass and the unsprung mass of a vehicle, comprising, control valve means having inlet and exhaust valve means for controlling flow of fluid to and from fluid suspension means, valve operating means connected with said inlet and exhaust valve means to operate the same, actuating means operated by a change in clearance height between the sprung mass and the unsprung mass of a vehicle connected with said valve operating means to operate the same, said valve operating means and said actuating means having operating connection by means of a multiple face cam providing for positioning of said valve operating means in different angular relationship relative to said actuating means whereby to change the effective operating position of the said valve operating means relative to said actuating means to change the clearance height between the sprung mass and the unsprung mass of the vehicle from one value to another, spring means biasing said valve operating means to position the said valve operating means in engagement with one of the faces of said cam to position said valve operating means in one angular position relative to said actuating means, and means changing the biasing effect of said spring means on said valve operating means to change the angular relationship between the valve operating means and said actuating means by engagement with the other of the faces of said multiple face cam changing thereby the operating relationship between the said valve operating means and said actuating means to establish thereby a predetermined clearance height of different value between the sprung mass and the unsprung mass of the vehicle.

4. A height control or leveling valve constructed and arranged in accordance with claim 3 wherein the said means changing the biasing effect of the said spring means to change the angular relationship of the valve operating means relative to the actuating means comprises means actuated in response to manual activation by the operator of the vehicle.

5. A height control or leveling valve for use in a fluid suspension system for a vehicle to maintain multiple positions of predetermined clearance height of different value between the sprung mass and the unsprung mass of a vehicle, comprising, control valve means having inlet and exhaust valve means for controlling flow of fluid to and from fluid suspension means, valve operating means connected with said inlet and exhaust valve means to operate the same, oscillatable shaft means carrying said valve operating means to operate the valve means on oscillation of the shaft means, said shaft having radially disposed angularly related faces, actuating means for connection with a vehicle suspension to oscillate the shaft means in response to a change in said clearance height, said actuating means engaging one of said faces as normally retained by resilient biasing means establishing thereby a first predetermined angular relationship between said valve operating means and said actuating means whereby to establish and maintain a first predetermined clearance height between the sprung mass and the unsprung mass of a vehicle and being movable by actuation of said biasing means into engagement with the other of said faces establishing thereby a second and different angular relationship between said valve operating means and said actuating means whereby to establish and maintain a second and different predetermined clearance height between the sprung mass and the unsprung mass of the vehicle.

6. A height control or leveling valve constructed and arranged in accordance with claim 5 that includes spring biasing means engaging said valve operating means to bias the same in a direction to effect engagement of the said actuating means with one of said faces, and means operably effective on said spring biasing means to cause the same to effect biasing of said valve operating means in the opposite direction to effect engagement of the said actuating means with the other of said faces and thereby change the angular relationship of the said valve operating means relative to said actuating means from the said first position to the said second position.

7. A height control or leveling valve constructed and arranged in accordance with claim 6 wherein the means changing the biasing effect of the said biasing spring means comprises means under the control of the operator of the vehicle.

8. A height control or leveling valve for use in a fluid suspension system for a vehicle to maintain a predetermined clearance height between the sprung mass and the unsprung mass of the vehicle by supplying fluid under pressure to a fluid spring in response to a decrease of the predetermined clearance height and exhausting fluid from the spring in response to an increase of the predetermined clearance height, comprising, valve means having inlet and exhaust valve means controlling fluid flow to and from a fluid spring to be controlled, an oscillatable shaft in said valve means having a valve actuating arm on said shaft for oscillation therewith and having a free end engageable with said inlet and exhaust valve means to actuate the same by oppositely directed movements of the actuating arm, an overtravel mechanism carried on said shaft and including a member resiliently engaging said shaft to oscillate said shaft by movement of said overtravel mechanism and providing for resilience of movement of the overtravel mechanism to an extent greater than the movement required for actuation of the said inlet and exhaust valve means, the engagement of said member of said overtravel mechanism with said shaft being with either of two radially disposed angularly related flat faces on said shaft as normally retained by resilient biasing means operating on said oscillatable shaft whereby engagement of the said member with one of said faces will position the said overtravel mechanism in one angular relation relative to said valve operating arm and engagement of the said member with the other of said faces on actuation of the said biasing means will effect positioning of the said overtravel mechanism in a second and different angular relationship relative to said valve actuating arm, whereby the said predetermined clearance height between the sprung mass and the unsprung mass of the vehicle can be either of two selected values depending upon the selected angular relationship between the said overtravel mechanism and the said valve actuating arm.

9. A height control or leveling valve constructed and arranged in accordance with claim 8 that includes resilient spring biasing means engaging said valve actuating arm to position said valve actuating arm in one angular relationship relative to said overtravel mechanism, and means operably effective on said spring biasing means to change the effect of the biasing means to bias the valve actuating arm in the opposite direction and thereby shift the said angular relationship between the said valve actuating arm and the overtravel mechanism from the first position to the second position.

10. A height control or leveling valve constructed and arranged in accordance with claim 9 wherein the said means changing the biasing effect of said biasing spring means comprises means manually activated under control of the operator of the vehicle.

11. A height control or leveling valve constructed and arranged in accordance with claim 8 wherein the said biasing spring means comprises spring means disposed on opposite sides of said valve actuating arm and balanced normally to bias the said valve actuating arm to position one of said faces on said shaft in engagement with said member of said overtravel mechanism, and means activated under control of the operator of the vehicle effective on at least one of said spring means to change the biasing effect of the said spring means to position the other of said faces in engagement with the said member of said overtravel mechanism and thereby change the angular relationship between the said valve operating arm and said overtravel mechanism from the first position to the second position.

References Cited in the file of this patent

UNITED STATES PATENTS

| | | |
|---|---|---|
| 2,711,635 | Rockwell | June 28, 1955 |
| 2,768,547 | Noell | Oct. 30, 1956 |
| 2,820,647 | Jackson | Jan. 21, 1958 |